(12) United States Patent
Deutsch

(10) Patent No.: US 8,243,366 B1
(45) Date of Patent: Aug. 14, 2012

(54) PROJECTION SCREEN WITH WIND SHIELD

(75) Inventor: Robert Deutsch, Rockville, MD (US)

(73) Assignee: Deutsch Inc., Rockville, MD (US)

( * ) Notice: Subject to any disclaimer, the term of this patent is extended or adjusted under 35 U.S.C. 154(b) by 0 days.

(21) Appl. No.: 13/169,087

(22) Filed: Jun. 27, 2011

(51) Int. Cl.
*G03B 21/56* (2006.01)

(52) U.S. Cl. ........................................ 359/449; 359/443

(58) Field of Classification Search ................ 248/443, 248/449, 694; 135/87; D16/241; 52/2.11; 359/443, 449; 472/137; 352/242
See application file for complete search history.

(56) References Cited

U.S. PATENT DOCUMENTS

| | | | | |
|---|---|---|---|---|
| 4,323,301 A | * | 4/1982 | Spector | 359/443 |
| 4,339,175 A | * | 7/1982 | Astero | 359/451 |
| 5,012,832 A | * | 5/1991 | Turner | 135/87 |
| 5,127,722 A | * | 7/1992 | Nishitani | 359/443 |
| 5,379,786 A | * | 1/1995 | Lynam | 135/87 |
| 6,008,938 A | * | 12/1999 | Suehle et al. | 359/443 |
| 6,240,666 B1 | * | 6/2001 | Apel et al. | 40/610 |
| 6,282,843 B1 | * | 9/2001 | Shibaike et al. | 52/2.11 |
| 6,598,613 B2 | * | 7/2003 | Fritzche et al. | 135/124 |
| 6,874,263 B2 | * | 4/2005 | Ohmuku | 40/590 |
| 7,181,877 B2 | * | 2/2007 | Quade | 40/610 |
| D543,229 S | * | 5/2007 | Hochendoner | D16/241 |
| D558,814 S | * | 1/2008 | Wiener | D16/241 |
| 7,397,603 B2 | * | 7/2008 | Peterson et al. | 359/443 |
| 7,446,937 B2 | * | 11/2008 | Poretskin | 359/443 |
| 7,612,735 B2 | * | 11/2009 | Essig et al. | 343/915 |
| 7,920,326 B2 | * | 4/2011 | Clawson et al. | 359/443 |
| 7,942,533 B2 | * | 5/2011 | Ganzevoort | 353/79 |
| 7,961,388 B1 | * | 6/2011 | Deutsch et al. | 359/443 |
| 2005/0068618 A1 | * | 3/2005 | Poretskin | 359/443 |
| 2006/0250692 A1 | * | 11/2006 | Peterson et al. | 359/443 |
| 2008/0231815 A1 | * | 9/2008 | Ganzevoort | 353/79 |
| 2010/0007949 A1 | * | 1/2010 | Clawson et al. | 359/443 |

* cited by examiner

*Primary Examiner* — Clayton E Laballe
*Assistant Examiner* — Kevin Butler

(57) ABSTRACT

A wind shield is provided for a projection screen or imaging surface wherein a sheet of material is included behind the projection screen to reduce the impact of wind on the projection screen.

5 Claims, 2 Drawing Sheets

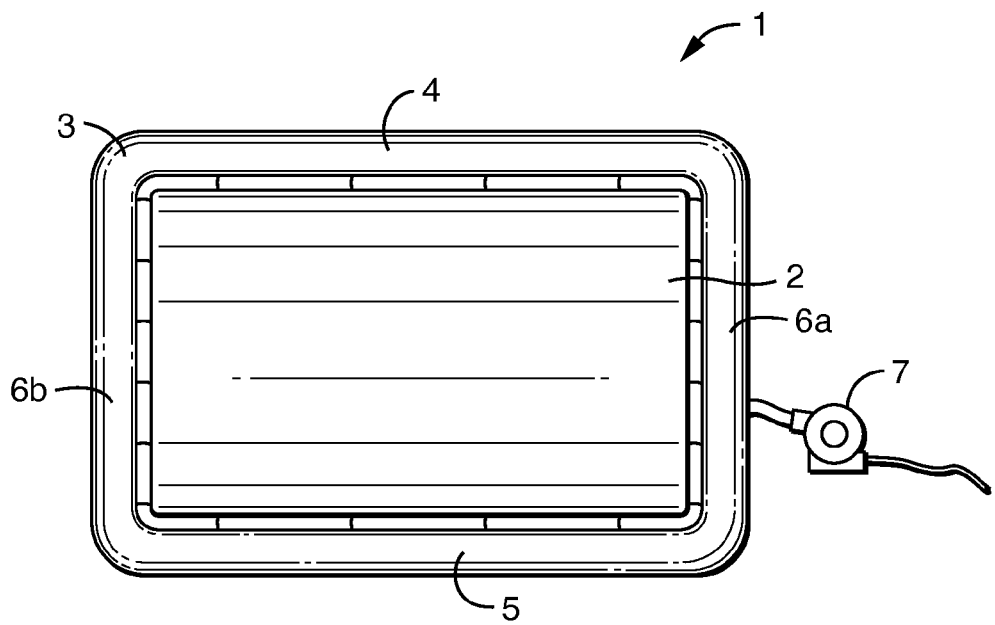
FIG. 1A
(PRIOR ART)
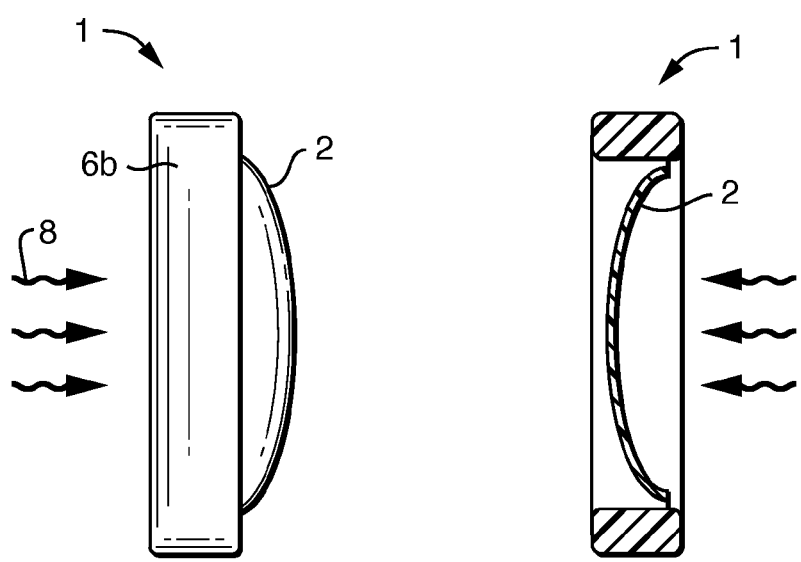
FIG. 1B
(PRIOR ART)
FIG. 1C
(PRIOR ART)

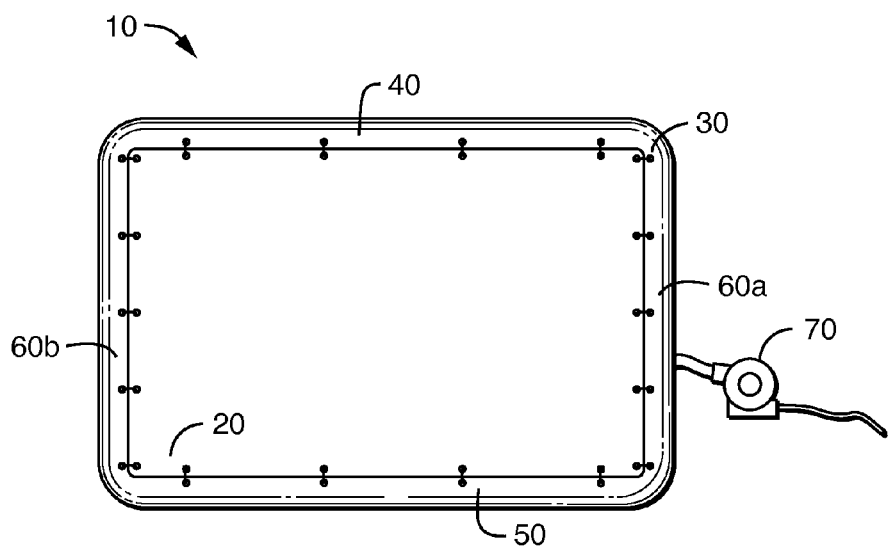
FIG. 2
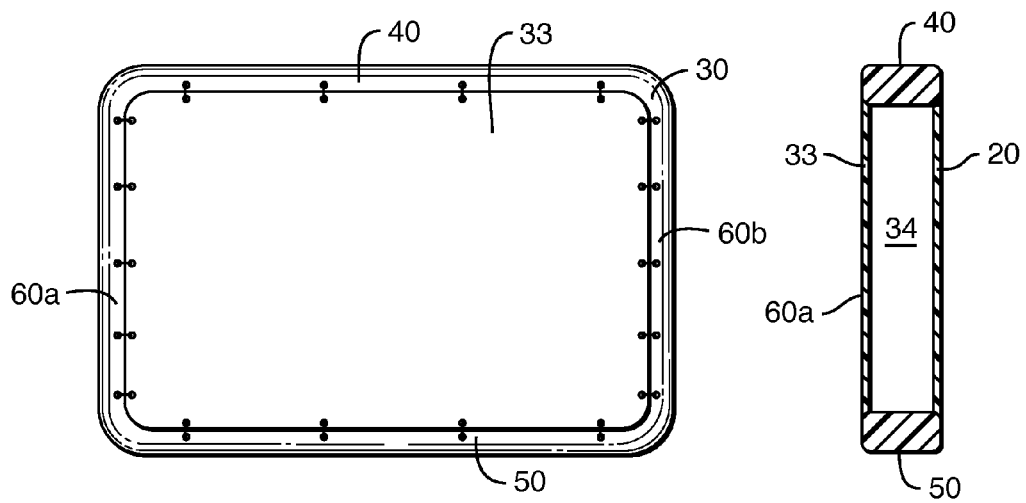
FIG. 3
FIG. 4

PROJECTION SCREEN WITH WIND SHIELD

CROSS-REFERENCE TO RELATED APPLICATIONS

None.

STATEMENT REGARDING FEDERALLY SPONSORED RESEARCH OR DEVELOPMENT

Not applicable.

FIELD OF THE INVENTION

This invention relates to inflatable devices that hold or include projection or imaging screens.

BACKGROUND OF THE INVENTION

Portable, temporary projection screens are known in the art. These screens can be quite large and are often used in outdoor environments. Therefore, the stability of the projection screen is important.

In an outdoor environment, the projection screen surface may billow outwardly or inwardly under the influence of wind. It is highly desirable for the screen projection surface to remain flat during use so that the projected images appearing on the screen are not distorted. Prior art screens typically secure the screen surface to the framework with a series of ties that serve to stretch the screen flat. However, for larger screens in particular, wind blowing toward the front of the screen can cause it to billow in like a sail. Wind blowing toward the back of the screen likewise can cause the screen to billow out. Such effects are undesirable for a projection screen.

Therefore, a need exists for a means of reducing the effects of wind on projection screens.

SUMMARY OF THE INVENTION

An object of the present invention is to provide a wind shield for a projection screen held up by a framework that serves to reduce the effect of wind on the projection screen. The wind shield is a sheet of material of a similar size to the projection screen that is attached to the back of the framework behind the projection screen such that the wind shield forms a plane that is approximately parallel to the plane of the projection screen.

It is a further object of the invention to include a lower panel below the projection screen if a gap exists between the bottom of the projection screen and the lower portion of the framework.

It is a further object of the invention that the area contained within the framework, screen surface, and wind shield be partially airtight.

It is a further object of the invention that the wind shield be easily detached from the inflatable screen structure.

It is a further object of the invention that the wind shield be capable of serving as a projection screen.

BRIEF DESCRIPTION OF THE DRAWINGS

FIG. 1a depicts an example of a prior art inflatable structure with a projection screen.

FIG. 1b is a side view of a prior art inflatable structure under the influence of wind from the rear.

FIG. 1c is a cutaway view of a prior art inflatable structure under the influence of wind from the front.

FIG. 2 is a perspective view showing the front side of an embodiment of the invention.

FIG. 3 is a perspective view showing the rear side of an embodiment of the invention.

FIG. 4 is a cutaway view of an embodiment of the invention.

DETAILED DESCRIPTION OF PREFERRED EMBODIMENTS

FIG. 1a shows an inflatable structure 1 for holding and mounting a projection screen 2 according to the prior art. The inflatable device 1 can be erected on a temporary basis, including in outdoor environments. The inflatable device 1 includes an inflatable framework 3 that can include a top 4, bottom 5, and side (6a, 6b) portions. A blower 7 is used to inflate the framework 3 and a series of guy wires (not shown) can be attached to the framework 3 in order to hold the framework 3 in place. The screen 2 is attached to the framework 3 by any suitable means that are designed to stretch the screen 2 and hold the screen 2 in a flat position. Once the framework 3 is fully inflated and secured, a movie, video, or other images can be displayed on the screen 2. Other types of frameworks can be used to hold projection screens, such as aluminum frameworks.

FIG. 1b shows the prior art structure of FIG. 1a under the influence of wind 8 blowing toward the back of the projection screen 2, causing the screen 2 to billow outward (toward the audience).

FIG. 1c is a cutaway view of the prior art structure of FIG. 1a under the influence of wind blowing toward the front of the projection screen 2, causing the screen 2 to billow inward (away from the audience). The billowing of screen 2 in either direction is undesirable as it can cause distortion of images shown on the screen 2.

A prior art strategy for reducing the effect of wind on screens is to stretch the screen and secure it tightly to the framework. However, screens and frameworks cannot be stretched so tightly that they distort or rip. Moreover, projection screens, especially larger projection screens, can catch wind so that they distort in shape, even when stretched as tightly as possible.

FIG. 2 depicts an embodiment of the present invention. The framework 30 of an inflatable structure 10 can be made of plastic vinyl material or other suitable material that can be sewn or heat welded together. The framework 30 is inflated using a blower 70 or other known method of inflation. Framework 30 comprises a top 40, bottom 50, and side (60a, 60b) portions. A screen 20 can be attached to framework 30 on a front side of the framework (the side from which images are viewed) and stretched flat. The screen can be attached with a suitable number of ties, which can consist of a series of bungee cords or ties stretched between rings or holes in the screen and grommets on the framework. A series of guy wires (not shown) can be attached to framework 30 in order to hold it in place during inflation and after inflation. If the projection screen 20 does not extend substantially down to the framework bottom 50, a lower panel (not shown) can be added to cover the front of the framework 30. Inflatable frameworks are common for use with temporary outdoor projection screens but other types of frameworks, such as aluminum frameworks, can be used with the present invention.

FIG. 3 is a rear view of the inflatable structure shown in FIG. 2. A wind shield 33 is attached to the rear side of the framework 30. The wind shield 33 can be made of any suitable fabric and can be attached to the framework in a manner similar to that used for the screen 20 and preferably is attached to the framework in a manner such that a partially airtight seal is formed. A partially airtight attachment can be accomplished in any suitable manner, for example by having the shield be slightly larger than the opening of the framework and having the grommets positioned on the framework such that when the wind shield is stretched and attached to the framework there can be an area of snugly fitting overlap between the framework and the wind shield.

The wind shield 33 is preferably of a similar shape as screen 20 and of a similar size. Screen 20 is preferably attached to the front of the framework in a similar manner such that a partially airtight seal is formed between the screen 20 and the framework as well.

When in place, wind shield 33 serves to reduce the effects of wind on screen 20. The effects of wind on screen 20 are reduced because wind shield 33 can serve to absorb much of the force exerted by the wind. As shown in FIG. 4, an area 34 exists between screen 20 and wind shield 33. This gap 34 is preferably about the distance between the front of the framework 30 and the rear of the framework 30. Wind blowing toward the rear of the screen 20 may be blocked by wind shield 33, which diminishes the impact of such wind on screen 20. In addition, wind blowing toward the front of screen 20 will not impact screen 20 as much as it otherwise would if a wind shield 33 were not in place because of the cushion of air formed within area 34 formed by screen 20, framework 30 and wind shield 33. Preferably, the area 34 within screen 20, framework 30 and wind shield 33 is made partially airtight by the manner of attachment of wind shield 33 and screen 20 to framework 30 to enhance the effectiveness of the cushion of air in reducing the effect of wind blowing toward the front of the projection screen. Thus, when wind direction is from the rear of the framework the wind shield can absorb some of the impact of the wind. This shields the projection screen surface from distortion. When wind direction is from the front of the framework and presses against the projection screen surface, the air trapped between the screen surface, the framework and the wind shield forms a cushion of air that can serve to reduce distortion of the screen surface. In the event that the screen is sized such that a significant gap is left between the screen and the bottom of the framework, a panel of material can be added to allow area 34 to be partially airtight.

In another embodiment, the wind shield can also serve as a projection screen. In this way, either side of the inflatable structure can serve as the projection screen and the opposite side can serve as the wind shield, depending on current conditions.

In another embodiment, a wind shield of the invention can be included on an aluminum framework device in order to reduce the effects of wind on a projection screen attached to the framework.

The invention claimed is:

1. An inflatable screen comprising:
an inflatable framework including a top portion, a bottom portion, and side portions and having a front side and a rear side;
a projection screen attached to the front side of the inflatable framework such that the screen forms a plane and is substantially free of curvature out of the plane in the absence of wind; and
a wind shield attached to the rear side of the inflatable framework such that the wind shield is generally flat and forms a plane that is generally parallel to the plane of the projection screen, wherein the projection screen and the wind shield are substantially impermeable to air flow and are attached to the framework such that a partially airtight chamber is formed containing at least atmospheric pressure that acts to reduce distortion of the projection screen when a force is exerted on the front side of the projection screen.

2. The screen of claim 1 wherein the wind shield is a projection screen.

3. The screen of claim 1 wherein the wind shield is removably attached.

4. A device for holding a projection screen comprising:
a framework having a front side and a rear side;
a projection screen attached to the front side of the framework such that the screen forms a plane and is substantially free of curvature out of the plane in the absence of wind; and
a wind shield attached to the rear side of the framework such that the wind shield, the framework and the projection screen form a partially airtight chamber containing at least atmospheric pressure wherein the chamber acts to reduce distortion of the projection screen when a force is exerted on the front side of the projection screen.

5. The device of claim 4 wherein the wind shield is a projection screen.

* * * * *